United States Patent

Holzer

[11] Patent Number: 5,579,392
[45] Date of Patent: Nov. 26, 1996

[54] DUPLICATING AND CIPHERING DEVICE AND METHODS FOR CODIFICATION OF FACSIMILE TELECOPIES

[76] Inventor: Walter Holzer, Drosteweg 19, 7758 Meersburg, Germany

[21] Appl. No.: 723,573

[22] Filed: Jul. 1, 1991

[30] Foreign Application Priority Data

Jul. 4, 1990 [DE] Germany .......................... 40 21 061.8
Jul. 11, 1990 [DE] Germany .......................... 40 21 783.3

[51] Int. Cl.⁶ ..................................................... H04L 9/00
[52] U.S. Cl. ......................................................... 380/18
[58] Field of Search .................................................. 380/18

[56] References Cited

U.S. PATENT DOCUMENTS

| | | | |
|---|---|---|---|
| 4,989,244 | 1/1991 | Naruse et al. | 380/18 |
| 5,001,750 | 3/1991 | Kato et al. | 380/18 |
| 5,007,084 | 4/1991 | Materna et al. | 380/18 |

*Primary Examiner*—Salvatore Cangialosi

*Attorney, Agent, or Firm*—Baker & Daniels

[57] ABSTRACT

A duplicating and ciphering device in which, in order to retain the privacy of the document to be transmitted, the individual units of the duplicating and ciphering device are constructed as a duplicating machine, and annexation possibilities for an electronic memory for storing the information taken from the scanner and for a coding mechanism for coding this information. Such device can be used as a duplicating machine as well as a ciphering device for coding information before entering it into a fax machine. It is also suited to again emit incoming, encoded information in clear text. A method for coding facsimile telecopies is included whereby in sending, the original is scanned and transmitted line by line and at the receiving end a similar copy true to the original is printed out. In order to prevent confidential information from falling into the wrong hands, the content of the digital transmitted information is coded. A memory stores several dot rows and a coding mechanism, which interchanges the sequence of the stored dot rows and/or alters the relative position of the dot rows. The decoding follows then through entering a password or a coding card, for example.

17 Claims, 2 Drawing Sheets

DUPLICATING AND CIPHERING DEVICE AND METHODS FOR CODIFICATION OF FACSIMILE TELECOPIES

The invention relates to a duplicating and ciphering device, consisting of an insert part, a scanner, which includes one or more dot rows, a printer with paper feed, and an output part.

The invention has to do particularly with a device for the codification of facsimile telecopies, which when sent, the original is scanned in one or more dot rows and transmitted, and then when received, is printed in a copy that is true to the original.

In recent years facsimile telecopies have been very successful and proven themselves extraordinarily. Today fax machines are in many cases replacing mail letters since facsimiles are received in a much shorter time.

Unfortunately, it frequently occurs that mismailed letters are delivered at an incorrect address and thereby in certain circumstances confidential information becomes known. But confidential telecopies can also reach the wrong hands, so that in the broadest sense the inviolability of letters is no longer guaranteed.

Devices are already known which by means of storing information received, prevents printing, and the printing is enabled only by use of a password.

However this form of privacy of information does not always prevent misdirecting letters and the content of such telecopies falling into the wrong hands. Even so, the safe keeping of transmitted information at one stage is not possible without additional measures. To remedy this disadvantage, the invention includes a feature in which a simply produced duplicating and ciphering device is used as a simple duplicating machine as well as for coding information, before the information is entered into a fax machine, but which is also capable of putting incoming ciphered information back into clear text.

Such a device can essentially consist of known parts of fax machines. They consist normally of an insertion part for the original, a scanner which scans one or more dot rows, a printer with paper feed, and an output part.

This standard equipment allows the making of copies. According to the invention such standard equipment is combined with further module units and indeed with an electronic memory for storing the information taken from the scanner, and with a coding device for coding this information.

In the patent application P 40 21 061.8 simple ciphering methods are described which are suited for use with a device according to the present invention.

For entering a code into the coding device, a keyboard and/or a reading device from an input-output medium is provided, for example a magnetic card.

Appropriately, the reading device is also developed for the coding of an input-output medium, for example a magnetic card.

As a further means for remedying these disadvantages, the present invention includes a memory means for temporary storage of several dot rows, and connected with the memory device a coding device of such type that the order of the stored dot rows is transposed and/or the relative position of the dot rows is otherwise changed.

If the dot rows were only pushed together, it could be determined from the beginning of a line how many dot units the dot rows were moved in the coding.

To prevent that possibility of that being determined, it is provided that the empty spaces resulting from the alteration of the relative position of the dot rows be temporarily overlaid with dots by means of a random generator.

The coding device must of course receive the desired code by means of a keyboard, whereby, in place of the keyboard or a complement thereof, a coding card is utilized, which by frequent repetition fixes the exchange and/or alteration of the relative position of the dot rows.

In order to prevent even mismailed items from transmitting confidential information to an undesired location, according to the invention, the coding is arranged by the sender before transmitting.

In such a case it is of course necessary that the receiver also have a coding device, which by means of a keyboard and/or a coding card, determines the exchange and/or alteration of the relative position of the dot rows.

The provision of synchronized signals in regular intervals, for example after each eighth row, essentially simplifies the correct transmitting of information.

Likewise a "Startcode" that can be set as desired simplifies the coding and decoding, since in this manner plain text and coded information can be mixed in sending or receiving.

In order to make a fax machine user-friendly, the invention includes the feature that the same coding device is used for the coding as well as the decoding, which can be switched from "coding" to "decoding".

Since most fax machines are also provided with the capacity to copy originals, the invention provides that a coded, printed copy can be transformed again into a copy true to the original after entering the coding, thereby essentially expanding the functions of a fax machine.

Also after entering a "Receive" code, a revision of a strangely coded copy, which is not legible, can be issued true to the original when copied anew. Accordingly, the method of the invention also enables the storage of private information, which is only legible after renewed copying. With simple and known means a coding device can also be combined with a device that enables the storing of the code in the device or in an external storage place, for example in the form of a coding card.

A simple example of facsimile-data transmission is described in the following.

Figure 1:
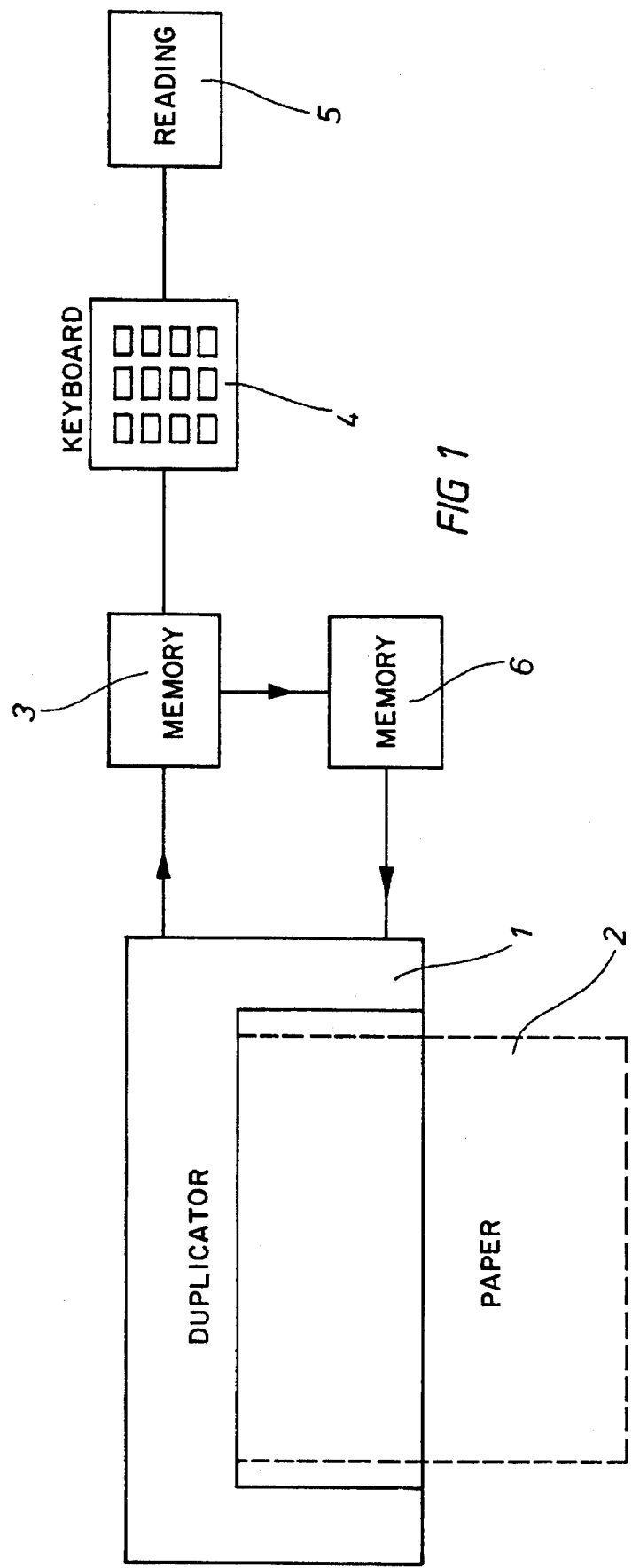
FIG. 1: a schematic arrangement of a duplicating and ciphering device according to the invention.

The duplicating device 1 includes, in known form and as usual with a facsimile machine, a scanner, which scans one or several dot rows, and for the printout, a printer with paper feed and an accompanying output part. The original paper 2 is laid in known manner in the duplicating machine 1 and scanned by the scanner.

So long as the machine is used only for copies, the printer receives the information from the scanner and prints a corresponding copy.

Should a ciphered copy be made, the information received by the scanner is directed to a memory 3 where it is stored. The memory 3 can be pre-coded in such manner by means of a keyboard 4 or a reading device 5 that it displaces and/or interchanges the lines of the stored information, which are in dot rows, as is described in German patent application No. P 40 21 061.8 referred to above.

Corresponding to the entered coding, the information now ciphered is put in by means of a memory 6 and issued from the printer as a ciphered copy.

The advantage of a duplicating and ciphering machine according to the invention consists in that it can be used with any desired fax machine available on the market. No electric connection is needed, since the ciphered original can be entered directly into each fax machine.

A further advantage is that for the use of such a machine no license from the postal or any other authority is required.

A further feature of the invention is that other methods can also be used for the coding of information. Thus it is conceivable to use an eight digit code number for ciphering, with each entered digit determining the displacement in the individual dot rows as well as the vertical interchange of the dot rows. Such form of ciphering would essentially simplify the handling of the machine, but make the decoding significantly more difficult.

As a data carrier, a programmable magnetic card was previously referred to, but other systems are also suitable for entering a corresponding ciphering code, such as, to name a few, magnetic strips, punch cards, or cards with bar code which can be prepared by hand.

Figure 2:
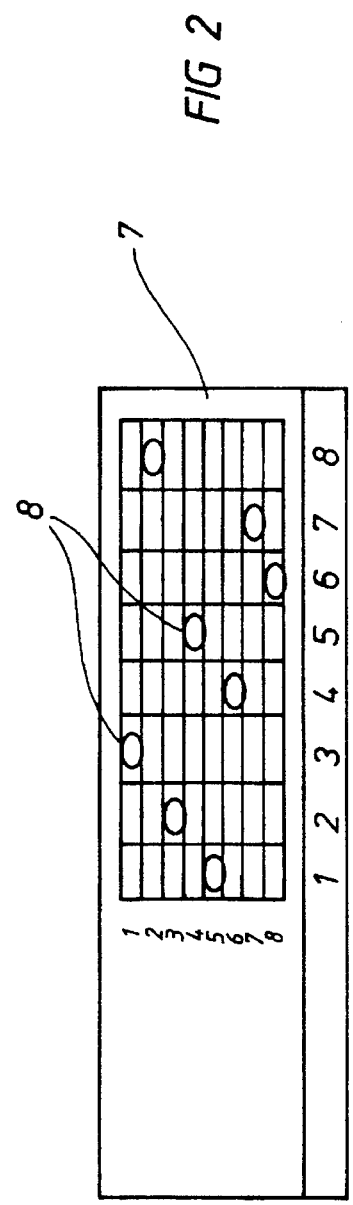
FIG. 2: a performance example in which a card conveys the position of each line or the displacement of the dot rows when markings are entered on it, with a ball point pen.

FIG. 2 shows a performance example in which a card 7, for example, by means of entering markings 8 with a ball point pen, specifies the position of each line or the displacement of the dot rows. The machine also allows the ciphering of ordinary texts or information which is not sent by fax.

The simple construction of a duplicating and ciphering machine according to the invention makes possible in certain circumstances a portable operation, so that one could carry secret documents without running the danger that they might be understood, if stolen, for example.

Figure 3:
FIG. 3: the resolution of 8 dot rows, which contain the word "FAXCODE".
Figure 4:
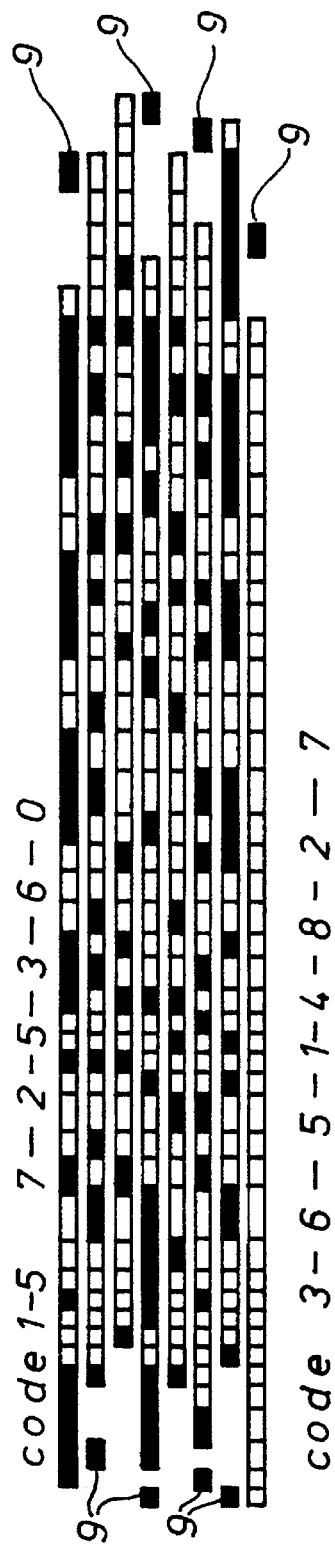
FIG. 4: depiction of a storage with a code entered.

FIG. 3 shows the resolution of 8 dot rows which contain the word "FAXCODE". If these 8 dot rows should be separately stored in a memory according to the invention, and each dot row displaced corresponding to a code, for example, 1-5-7-2-5-3-6-0, corresponding to the dot count to which each dot row is displaced, the picture would be altered, as presented in FIG. 4. Of course the grid shown in FIGS. 3 to 6 would not be printed. However, the vertical line of the letter "F" would make discernible how many points the dot rows have been displaced. Thus it would be easy to recognize the code and thereby make it decipherable.

In order to prevent this possibility, the points 9 would be inserted from a random generator and thereby not enable the displacement of the dot rows to be discerned.

Figure 5:
FIG. 5: another form of coding, whereby the lines are vertically interchanged.

FIG. 5 shows another manner of coding, in which the rows are vertically interchanged. In this example, "3-6-5-1-4-8-2-7" corresponds to the exchanged order of the dot rows, which likewise yields an indiscernible picture.

Figure 6:
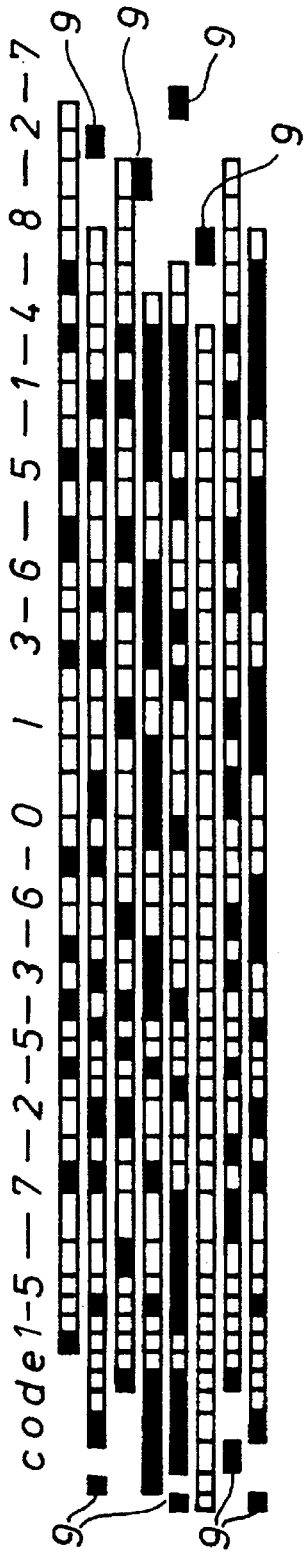
FIG. 6: the combination of both codes, that is, the lines are displaced, with the resulting empty spaces being filled by means of a random generator, and additionally the lines are interchanged.

FIG. 6 shows finally the combination of both codes, that is, displacement of the rows with the resulting empty spaces filled by a random generator, and also interchange of the rows. FIG. 6 shows clearly that such a coding is practically impossible to decipher. With a coding of only 8 dot rows, and a maximum displacement of 8 points, over 16 million possibilities result, of which certainly not all would be meaningful, and combined with interchange of the rows, if one limits himself to meaningful combinations, this would increase the count of possibilities by a factor of 40,000, which would result in about 640,000 million combinations.

In order to make the method most error free, it is provided that during the transmitting, a synchronizer impulse, for example each 8 or 16 dot rows, is transmitted also since this step is not utilized for the normal transmitting of facsimile information. The particular design example described includes only essential points and advantages of the method according to the invention. All meaningful additional adaptations for digital transmitting methods are optimally useful and possible. Also a limitation to the partial use of all the features of the invention, for reasons of simplification or cost, is possible.

However ramification of the described example, through exclusion or addition of certain characteristics, fall within the broad scope of the invention.

I claim:

1. Duplicating and ciphering apparatus that includes, a duplicating component incorporating insert means for receiving an original paper, a scanner for scanning one or more dot rows on the paper, a printer, means for feeding the paper, and output means for putting out the printed paper, the apparatus comprising, the duplicating component having connections for an electronic memory for storing information read by the scanner, and for a coding and ciphering device for coding and ciphering that information, the apparatus further comprising, said coding and ciphering device connected to the duplicating component, said coding and ciphering device including a keyboard, means for manually changing the ciphering process and a reading device for reading information from removable input-output medium.

2. Apparatus according to claim 1 in combination with, said removeable input-output medium that is constituted by a magnetic card.

3. Apparatus according to claim 1 wherein, said reading device encodes information on an input-output carrier.

4. Apparatus according to claim 1 in combination with, said input-output medium that includes a card encoded by hand.

5. Apparatus according to claim 1 wherein, the electronic memory and coding device constitute auxiliary modules, and the apparatus having said auxiliary modules retro-connected to said duplicating component as a base mechanism.

6. A method of coding and ciphering facsimile telecopies, wherein an original copy is scanned in one or more dot rows, transmitted and when received printed as a copy true to the original, comprising the steps, by means of a memory device, storing the dot rows, and, by means of a coding and ciphering device, changing the sequence, and relative positions of the dot rows.

7. A method according to claim 6 wherein, the change in the sequence of the dot rows results in empty spaces between the dot rows, and including the step partially filling the empty spaces with dots at random positions.

8. A method according to claim 6, and including the step, utilizing the coding and ciphering device and by means of a coding and ciphering card that constitutes an input-output device, predetermining the positions of the dot rows in the step of changing the sequence and relative positions of the dot rows.

9. A method according to claim 6 and including, the step of coding the copy by the sender before transmitting.

10. Apparatus according to claim 1 and including, a coding and ciphering device accessible to the receiver that includes a keyboard and a coding and ciphering card for predetermining the positions of the dot rows in changing the sequence and relative positions of the dot rows.

11. Apparatus according to claim 10 wherein, the same said coding and ciphering device is for ciphering and deciphering.

12. Apparatus according to claim 10 wherein, the printer is for printing from the original paper in code, and in response to entering the code, is for printing true to the original paper.

13. Apparatus according to claim 12 wherein, the coding and ciphering means is for receiving a "Send" code, and a "Receive" code, and in response to so receiving such codes, the printer is for making an illegible and a legible copy, respectively.

14. Apparatus according to claim 13 wherein, the coding and ciphering device is for having the "Send" code and "Receive" code entered in the same manner.

15. Apparatus according to claim 13 wherein, the coding and ciphering device is connected with a device for storing the code in the coding and ciphering device and in an external memory such as a coding card.

16. Apparatus according to claim 13 wherein, the coding and ciphering device is responsive to a "Start-code" signal, and that signal is predeterminedly set in random manner.

17. Apparatus according to claim 13 wherein, the coding and ciphering device is for receiving a synchronizing signal and thereby for controlling the code.

\* \* \* \* \*